(12) United States Patent
Pavlov et al.

(10) Patent No.: US 6,433,506 B1
(45) Date of Patent: Aug. 13, 2002

(54) SENSORLESS CONTROL SYSTEM FOR INDUCTION MOTOR EMPLOYING DIRECT TORQUE AND FLUX REGULATION

(75) Inventors: Alexey Pavlov, Eindhoven (NL); Alexander T Zaremba, Dearborn Heights, MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/820,490

(22) Filed: Mar. 29, 2001

(51) Int. Cl.[7] .................................................. H02P 7/63
(52) U.S. Cl. ........................ 318/804; 318/799; 318/801; 318/811
(58) Field of Search ................................ 318/727, 767, 318/798–801, 804–812

(56) References Cited

U.S. PATENT DOCUMENTS

| | | | | |
|---|---|---|---|---|
| 5,162,727 A | * | 11/1992 | Hindsberg et al. | 318/805 X |
| 5,729,113 A | * | 3/1998 | Jansen et al. | 318/799 |
| 5,821,727 A | * | 10/1998 | Yura | 318/809 |
| 5,969,498 A | * | 10/1999 | Cooke | 318/799 |
| 6,014,066 A | | 1/2000 | Stuntz et al. | |

* cited by examiner

Primary Examiner—Bentsu Ro

(57) ABSTRACT

A sensorless control system for an induction motor employs direct tracking of torque and flux regulation to achieve improved motor control without the need for transformation to the rotor flux related frame. A novel torqueflux dynamic model used to implement the control method employs stator voltage as an input, and achieves separation of torque and flux regulation. An alternate regulation method better suited for slow reference signals relies on a steady state solution of the dynamic model.

10 Claims, 2 Drawing Sheets

SENSORLESS CONTROL SYSTEM FOR INDUCTION MOTOR EMPLOYING DIRECT TORQUE AND FLUX REGULATION

FIELD OF INVENTION

The present invention generally relates to control systems for induction motors, particularly of the sensorless type, and deals more particularly with a control system that provides direct regulation of motor torque and flux.

BACKGROUND OF THE INVENTION

In recent years, substantial research has been devoted to sensorless drive systems for controlling induction motors in order to achieve high dynamic performance, preserving low cost and endurance. Such systems eliminate the need for position sensors and estimate the positions of the rotor and/or rotor flux. Broadly, these prior systems are either of the type that track machine spatial saliencies, or those that use a variety of control methods for speed and flux control estimation.

The spatial saliencies tracking method requires injection of separate high frequency carrier signal and operates best at low speed. This method is based on the accurate analysis of machine physical structure irregularities and has intrinsic limitations originating from the requirements of separation of fundamental and carrier frequencies and detection of a low amplitude spatial information signal.

The control methods of the second group rely on different control techniques. One of the approaches is based on augmentation of the plant to include dynamics of unknown parameters, and the use of state dependent Riccati equation filter methodology. A particular control method employs two complementary speed and flux observers or estimators. The main speed and flux estimator operates in the monitoring and generating region and requires knowledge of the motor speed sign. The auxiliary estimator operates in generating and braking modes but can be justified if motor speed varies sufficiently slowly. However, the switching between the two estimators can cause divergence when the induction motor is operated at low speed under large load. The high gain speed estimator is utilized in a reference frame related with an estimated flux estimation vector. Rigorous closed loop analysis taking into account rotor resistance variation, and error in estimation of rotor flux and speed provides conditions under which asymptotic torque regulation is achieved.

An object of the invention is to provide a method for controlling an induction motor that does not use a transformation to the rotor flux related frame and that is based on a unique dynamic torque-flux model to control electromagnetic torque and rotor flux.

SUMMARY OF THE INVENTION

In accordance with the primary object of the invention, in a preferred embodiment, a method for controlling an induction motor comprises separately tracking the motor's torque and flux through the use of a dynamic torque-flux model, with stator voltage as an input.

An advantage of the present method is that the control method provides PI regulation of the torque and PD regulation of the flux in a manner that assures asymptotic stability of torque and flux tracking. An added advantage of the invention is that a steady state solution of the torque-flux dynamic model may be used for slow reference signals that minimizes tracking error created due to noise in the current signal.

These and other features and advantages of the present invention may be better understood by considering the following details of a description of a preferred embodiment of the invention. In the course of this description, reference will frequently be made to the attached drawings.

DETAILED DESCRIPTION OF THE PREFERRED EMBODIMENT

Figure 1:
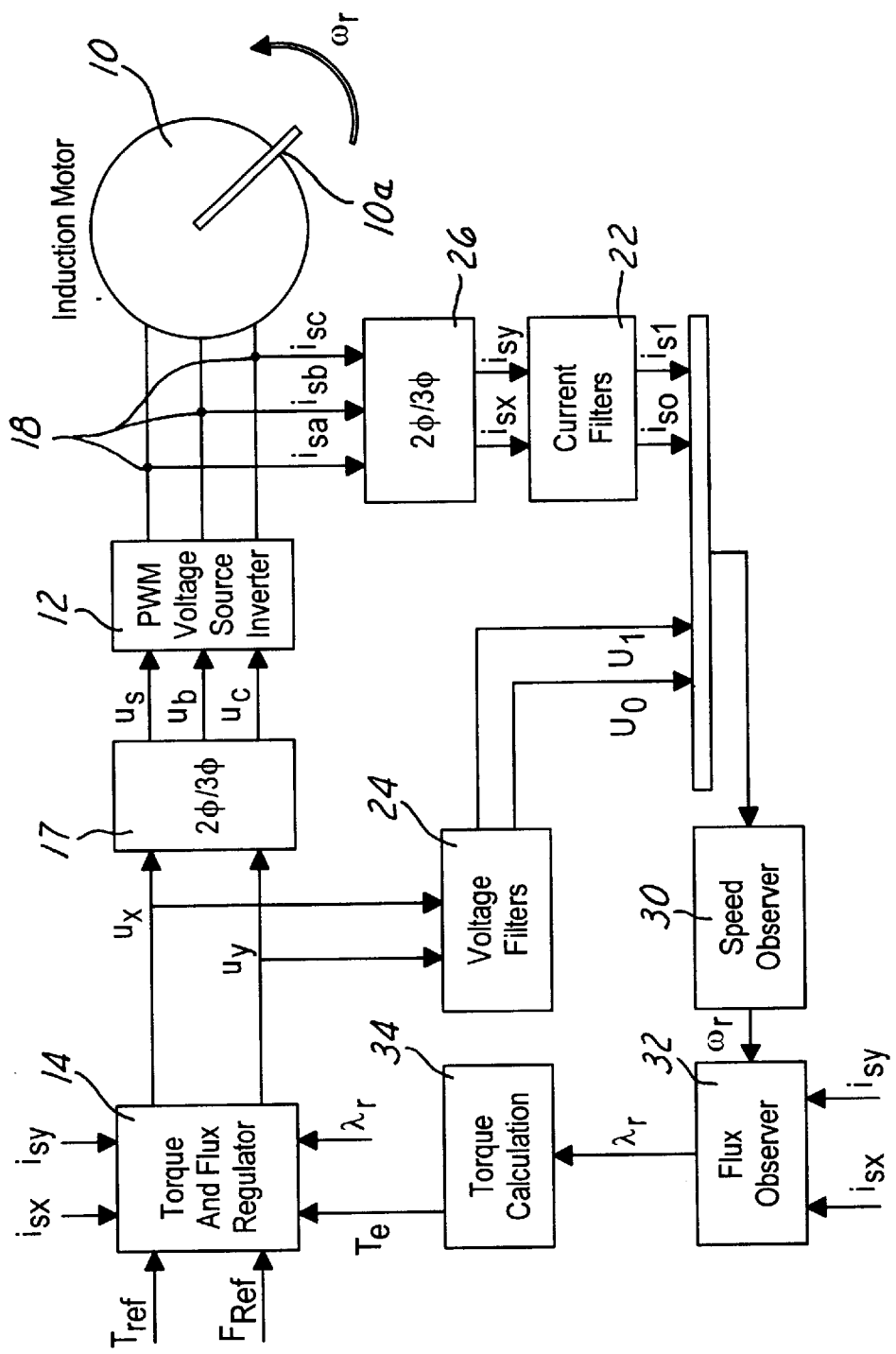
FIG. 1 is a block diagram of an induction motor and related control system that forms the preferred embodiment of the present invention.

Referring to FIG. 1, a block diagram of a motor control system in accordance with the preferred embodiment of the present invention is illustrated. In particular, an induction motor 10 is shown driven by a pulse width modulating (PWM) voltage source inverter 12, a torque and flux regulator 14, two-to-three phase transformation block 17, current filters 22, stator voltage filters 24, three-to-two phase transformation block 26, a speed observer or estimator 30, and a flux observer 32 providing estimated flux values to rotor torque calculator 34.

Polyphase current rotating in the same direction as, but faster than, the rotor 10a of the induction motor 10 will create a torque in a direction so as to aid in rotor rotation. In this operational mode, net electrical power flow is into the motor electrical terminals, and the motor 10 is considered to be in a "motoring" mode. Conversely, polyphase currents rotating slower than the motor create a torque in a direction opposing the rotor rotation. Net electrical power flow is thus out of the motor electrical terminals, and the motor 10 is considered to be in a "generating" mode.

Regulator 14 sends stator voltage commands $u_x$ and $u_y$ to transform block 17 which rotates the voltage commands $u_x$ and $u_y$ from the two phase frame to three phase, thereby producing the transformed commands $u_a$, $u_b$, $u_c$ which are delivered to inverter 12 for control of the motor 10. Stator current filters 22 receive the measured current signals from current sensors 18 and transform block 26 which rotates the measured current signals $i_{sa}$, $i_b$, and $i_{sc}$ from the three phase frame to two phase frame to provide measured stator currents $i_{sx}$ and $i_{sy}$ to the current filters 22. The current filters 22 are used to generate pseudo currents $i_{s0}$, $i_{s1}$ and sends them to speed observer or estimator 30.

The voltage filters 24 receive commanded stator voltage signals $u_x$ and $u_y$ calculated in the stationary frame and generate pseudo voltage signals $u_0$ and $u_1$ which are then sent to speed observer or estimator 30.

The speed observer 30 estimates the rotational electrical speed of rotor 10a by processing a system of algebraic equations using the pseudo stator current signals $i_{s0}$, $i_{s1}$, and pseudo stator voltage signals $u_0$, $u_1$ as inputs to the equations. The estimated rotor speed, $\hat{\omega}_r$ is sent to the flux observer 32 which estimates the rotor flux, $\hat{\lambda}_r$, directly from rotor speed and stator current signals. The estimated rotor flux $\hat{\lambda}_r$ is used to calculate the estimated torque $\hat{T}_e$ at block 34. The estimated torque $\hat{T}_e$ is used along with the estimated rotor flux $\hat{\lambda}_r$, the reference flux value $F_{ref}$, the reference torque value $T_{ref}$, and measured stator currents $i_{sx}$, $i_y$ to directly control induction motor 10 without the need for transformations. Current filters 22, voltage filters 24, speed observer 30, flux observer 32, and torque calculator 34 may be implemented by a conventional microprocessing system forming part of a motor control unit.

Before explaining the details of the novel control system of the present invention, it will be first helpful to appreciate a dynamic model of an induction motor, and the related control problems.

Consider the dynamic model of an induction motor (IM) in the stator frame $$\frac{d\lambda_r}{dt} = \left(-\frac{R_r}{L_r}I + n_p\omega J\right)\lambda_r + \frac{R_r}{L_r}Mi_s \tag{1}$$

$$\frac{di_s}{dt} = -\frac{M}{\sigma L_s L_r}\left(-\frac{R_r}{L_r}I + n_p\omega J\right)\lambda_r - \frac{1}{\sigma L_s}\left(R_s + \frac{M^2 R_r}{L_r^2}\right)i_s + \frac{1}{\sigma L_s}v_s \tag{2}$$

$$\frac{d\Theta}{dt} = \omega \tag{3}$$

$$\frac{d\omega}{dt} = \mu i_s^T J \lambda_r - \frac{\alpha\omega}{m} + \frac{T_L}{m}, \tag{4}$$

where $$I = \begin{pmatrix} 1 & 0 \\ 0 & 1 \end{pmatrix} J = \begin{pmatrix} 0 & -1 \\ 1 & 0 \end{pmatrix}$$

$\lambda_r$, $i_s$, $v_s$—rotor flux, stator current and stator voltage command
$\Theta$—angular position of the rotor
$\omega$—angular speed of the rotor
$R_r$, $R_s$—rotor and stator resistance
$M$—mutual inductance
$L_r$, $L_s$—rotor and stator inductance
$\sigma = 1 - M^2/L_s L_r$—leakage parameter
$n_p$—number of pole pairs
$m$—moment of inertia of the rotor
$\alpha$—damping gain
$T_L$—external load torque
$\mu = 3n_p M/2L_r$
$T_e = \mu i_s^T J \lambda_r$—the electromagnetic torque.

The first control goal is for the electromagnetic torque to follow the reference value $T_{ref}$ $$\lim_{t\to\infty} T_e \to T_{ref} \tag{5}$$

To achieve the goal (5) the flux magnitude is to be kept at a certain level and the second control goal is $$\lim_{t\to\infty} |\lambda_r|^2 \to F_{ref}, \tag{6}$$

where $F_{ref}$ is the flux reference value.

It is assumed that the reference values $T_{ref}$, $F_{ref} \in C^1[R^+]$ and they should be selected accounting for constraints on the voltage and current signals. The detailed analysis of the effect of voltage and current constraints on control design is given below.

In direct torque and flux regulation the value of the rotor flux or its estimate is used. Thus the next problem is to construct an observer for the rotor flux with the convergence $$\lim_{t\to\infty} \hat{\lambda}_r \to \lambda_r \tag{7}$$

where $\hat{\lambda}_r$ is a rotor flux estimate.

In many applications it is desirable to avoid measurements of the rotor position or speed (such sensors make the system expensive and less reliable). Thus another problem is to estimate the rotor speed from the available for measurement stator current and stator voltage command $$\lim_{t\to\infty} \hat{\omega} \to \omega \tag{8}$$

where $\hat{w}$ is a rotor speed estimate.

Since parameters of an induction motor may change during its operation and their exact values may be essential for quality of control, the problem of online estimation of the motor parameters arises. In particular rotor and stator resistance are to be estimated $$\lim_{t\to\infty} \hat{P} \to P \tag{9}$$

where $P = [R_r, R_s]^T$ and $\hat{P}$ is its estimate.

The present invention provides a direct method of regulating the torque and flux that is based on novel dynamic equations for electromagnetic torque and rotor flux. Significantly, the novel method does not require the transformation to the d-q rotating frame, and, in a simplified version, the method behaves as a PI regulator of the torque and PD regulator of the rotor flux.

To derive the dynamic equation for the electromagnetic torque, the derivative of $T_e$ is calculated as follows:

$$\frac{dT_e}{dt} = \mu\left(i_s^T J \frac{d\lambda_r}{dt} + \frac{di_s^T}{dt} J\lambda_r\right) = \mu\left(i_s^T J \frac{d\lambda_r}{dt} - \lambda_r^T J \frac{di_s}{dt}\right). \tag{10}$$

By multiplying the equations (1) and (2) by $i_s^T J$ and $\lambda_r^T J$, respectively, the following formulae are obtained $$i_s^T J \frac{d\lambda_r}{dt} = i_s^T J\left(\left(-\frac{R_r}{L_r}I + n_p\omega J\right)\lambda_r + \frac{R_r}{L_r}Mi_s\right) = -\frac{R_r}{L_r}i_s^T J\lambda_r - n_p\omega i_s^T\lambda_r \tag{11}$$

$$= -\frac{R_r}{L_r\mu}T_e - n_p\omega i_s^T\lambda_r$$

$$\lambda_r^T J \frac{di_s}{dt} = \lambda_r^T J\left(-\frac{M}{\sigma L_s L_r}\left(-\frac{R_r}{L_r}I + n_p\omega J\right)\lambda_r - \frac{1}{\sigma L_s}\left(R_s + \frac{M^2 R_r}{L_r^2}\right)i_s + \frac{1}{\sigma L_s}v_s\right) \tag{12}$$

$$= -\frac{M}{\sigma L_s L_r}n_p\omega|\lambda_r|^2 - \frac{1}{\sigma L_s}\left(R_s + \frac{M^2 R_r}{L_r^2}\right)\lambda_r^T J i_s + \frac{1}{\sigma L_s}\lambda_r^T J v_s$$

$$= -\frac{M}{\sigma L_s L_r}n_p\omega|\lambda_r|^2 + \frac{1}{\sigma L_s\mu}\left(R_s + \frac{M^2 R_r}{L_r^2}\right)T_e + \frac{1}{\sigma L_s}\lambda_r^T J v_s.$$

Unifying expressions (10)–(12) yields the dynamic equation for the electromagnetic torque $$\frac{dT_e}{dt} = -kT_e - n_p\omega\mu\left(\frac{M}{\sigma L_s L_r}|\lambda_r|^2 + \lambda_r^T i_s\right) - \frac{\mu}{\sigma L_s}\lambda_r^T J v_s. \quad (13)$$

where $$k = \frac{R_r}{L_r} + \frac{1}{\sigma L_s}\left(R_s + \frac{M^2 R_r}{L_r^2}\right).$$

Dynamic equations for variable $|\lambda_r|^2$ can be obtained in a similar way. Multiplying equation (1) from the left hand side by $\lambda_r^T$ and utilizing the equalities $d/dt|\lambda_r|^2 = 2\lambda_r^T d/dt\lambda_r$ and $\lambda_r^T J\lambda_r = 0$ yields the expression for the derivative of $|\lambda_r|^2$:

$$\frac{d|\lambda_r|^2}{dt} = -2\frac{R_r}{L_r}|\lambda_r|^2 + 2\frac{R_r}{L_r}M i_s^T \lambda_r. \quad (14)$$

Equation (14) does not contain voltage as an input and the dynamic equation for the fictitious variable $(\lambda_r^T i_s)$ should be added. The derivative of $i_s^T \lambda_r$ may be calculated by multiplying equations (1) and (2) by $i_s^T$ and $\lambda_r^T$, respectively, and then summing them up $$\frac{d(i_s^T \lambda_r)}{dt} = -k i_s^T \lambda_r + \frac{R_r M}{L_r}|i_s|^2 + \frac{M}{\sigma L_s L_r}\frac{R_r}{L_r}|\lambda_r|^2 + \frac{n_p\omega}{\mu}T_e + \frac{1}{\sigma L_s}\lambda_r^T v_s. \quad (15)$$

By introducing the new state vector $Z = [z_1, z_2, z_3]^T = [T_e, |\lambda_r|^2, \lambda_r^T i_s]^T$ equations (13)–(15) can be rewritten in the following form:

$$\frac{dZ}{dt} = \begin{bmatrix} -k & -\frac{\mu M n_p \omega}{\sigma L_s L_r} & -\mu n_p \omega \\ 0 & -\frac{2R_r}{L_r} & \frac{2R_r M}{L_r} \\ \frac{n_p \omega}{\mu} & \frac{M R_r}{\sigma L_s L_r^2} & -k \end{bmatrix} Z + \begin{bmatrix} -\frac{\mu}{\sigma L_s}\lambda_r^T J v_s \\ 0 \\ \frac{R_r M}{L_r}|i_s|^2 + \frac{1}{\sigma L_s}\lambda_r^T v_s \end{bmatrix}. \quad (16)$$

Finally, by taking into account the equalities $\lambda_r^T v_s = |\lambda_r| v_{sd}$ and $\lambda_r^T J v_s = -|\lambda_r| v_{sq}$, and by performing decomposition of the stator voltage command $$v_s = \frac{\lambda_r}{|\lambda_r|} v_{sd} + \frac{J\lambda_r}{|\lambda_r|} v_{sq} \quad (17)$$

the final formula for torque and rotor flux dynamics is obtained $$\frac{dZ}{dt} = \begin{bmatrix} -k & -\frac{\mu M n_p \omega}{\sigma L_s L_r} & -\mu n_p \omega \\ 0 & -\frac{2R_r}{L_r} & \frac{2R_r M}{L_r} \\ \frac{n_p \omega}{\mu} & \frac{M R_r}{\sigma L_s L_r^2} & -k \end{bmatrix} Z + \begin{bmatrix} \frac{\mu}{\sigma L_s}|\lambda_r| J v_{sq} \\ 0 \\ \frac{R_r M}{L_r}|i_s|^2 + \frac{1}{\sigma L_s}|\lambda_r| v_{sd} \end{bmatrix}. \quad (18)$$

To fulfill the first control goal (5) of electromagnetic torque tracking the stator voltage command is chosen such that the torque $T_e$ satisfies the following reference equation $$\frac{d(T_e - T_{ref})}{dt} = -L_{TP}(T_e - T_{ref}) - L_{TI}\int_0^t (T_e - T_{ref}) ds, \quad (19)$$

where $L_{TP} > 0$ and $L_{TI} > 0$ are gains of the PI regulator selected to guarantee the exponential convergence of $T_e$ to the reference value. This can be done by cancelling the natural dynamics of $T_e$ (13) and setting the needed one corresponding to equation (19).

For this purpose the nonlinear addendum of the equation (13) must satisfy the equality $$-kT_e - \mu\lambda_r^T\left(\frac{M}{\sigma L_s L_r}\lambda_r + i_s\right)n_p\omega - \frac{\mu}{\sigma L_s}\lambda_r^T J v_s = \quad (20)$$

$$\frac{dT_{ref}}{dt} - L_{TP}(T_e - T_{ref}) - L_{TI}\int_0^t (T_e - T_{ref}) ds.$$

Substituting (17) into (20) defines the $v_{sq}$ component of the voltage signal $$v_{sq} = \frac{\sigma L_s}{\mu|\lambda_r|}\left[kT_e + \frac{dT_{ref}}{dt} + \lambda_r^T\left(\frac{M}{\sigma L_s L_r}\lambda_r + i_s\right)\mu n_p\omega\right] + \quad (21)$$

$$\frac{\sigma L_s}{\mu|\lambda_r|}\left[-L_{TP}(T_e - T_{ref}) - L_{TI}\int_0^t (T_e - T_{ref}) ds\right].$$

Thus only the component $v_{sq}$ of the stator voltage that is orthogonal to the rotor flux is responsible for torque control. Note that the magnitude of the rotor flux in the denominator of (21) can make the voltage signal high if the flux is not regulated properly.

The addendum with the derivative of the reference torque $dT_{ref}/dt$ guarantees that the electromagnetic torque converges to $T_{ref}$ exponentially. If this term is omitted, then the gains $L_{TP}$, $L_{TI}$ of the PI controller should be chosen properly (big enough) to preserve the servo property of the closed loop system.

The second control goal employed in the torque control of IM is the tracking of the rotor flux magnitude. In this case the squared norm of the rotor flux $|\lambda_r|^2$ is to be kept at a desirable, e.g., constant level $F_{ref}$.

To make the control input $v_s$ to appear explicitly in the equation of flux dynamics the equation (14) is differentiated $$\frac{d^2|\lambda_r|^2}{dt^2} = 2\frac{R_r}{L_r}\left(-\frac{d}{dt}|\lambda_r|^2 + M\frac{d}{dt}(i_s^T \lambda_r)\right). \quad (22)$$

Utilizing (15) the final formula for the rotor flux $|\lambda_r|^2$ is obtained $$\frac{d^2|\lambda_r|^2}{dt^2} = \quad (23)$$

$$2\frac{R_r}{L_r}\left[-\frac{d}{dt}|\lambda_r|^2 + M\left(-k i_s^T \lambda_r + \frac{R_r M}{L_r}|i_s|^2 + \frac{M}{\sigma L_s L_r}\frac{R_r}{L_r}|\lambda_r|^2\right)\right] +$$

$$2\frac{R_r}{L_r}M\left(\frac{n_p\omega}{\mu}T_e + \frac{1}{\sigma L_s}\lambda_r^T v_s\right).$$

The stator voltage command $v_s$ is to be chosen in such a way that $|\lambda_r|^2$ satisfies the following reference equation $$\frac{d^2|\lambda_r|^2}{dt^2} = \frac{2R_r}{L_r}\left(-L_{FD}\frac{d}{dt}|\lambda_r|^2 - L_{FP}(|\lambda_r|^2 - F_{ref})\right). \quad (24)$$

By proper selection of the gains $L_{FD}>0$, $L_{FP}>0$ the exponential convergence of $|\lambda_r|^2$ to $F_{ref}$ can be achieved. Substituting (17) into (23) gives $v_{sd}$ component of the stator voltage $$v_{sd} = \quad (25)$$

$$\frac{\sigma L_s}{M|\hat{\lambda}_r|}\left[\left((L_{FD}-1)2\frac{R_r}{L_r} - \frac{M^2 R_r}{\sigma L_s L_r^2} - L_{FP}\right)|\lambda_r|^2 + M\left(k + (1-L_{FD})2\frac{R_r}{L_r}\right)\right.$$

$$\left. i_s^T \lambda_r - \frac{R_r}{L_r}M^2|i_s|^2 - \frac{M\omega n_p}{\mu}T_e + L_{FP}F_{ref}\right].$$

The obtained formula for control of rotor flux magnitude shows that only the $v_{sd}$ component of the stator voltage commands the variable $|\lambda_r|^2$.

The condition that $F_{ref}$ is constant may be omitted. Instead, one should demand that $F_{ref}$ is a smooth function with bounded derivative. In this case it is possible to preserve the servo property of the controller by increasing the gains $L_{FD}$ and $L_{FP}$.

Since different components of the stator voltage command are responsible for torque control and flux magnitude control, these two goals may be achieved simultaneously. In this case stator voltage command must be chosen as (17) where $v_{sq}$ and $v_{sd}$ are defined according to (21) and (25).

The value of the rotor flux $\lambda_r$ used in this control algorithm is not available for measurement. Thus the estimator for $\hat{\lambda}_r$ must be utilized instead.

Knowing the value of the rotor speed the rotor flux observer based on equation (1) is constructed. Then the overall controller ("PIDB"—PID Based controller) has the form $$\frac{d\hat{\lambda}_r}{dt} = \left(-\frac{R_r}{L_r}I + n_p\omega J\right)\hat{\lambda}_r + \frac{R_r}{L_r}Mi_s \quad (26)$$

$$\hat{v}_s = \frac{\hat{\lambda}_r}{|\hat{\lambda}_r|}\hat{v}_{sd} + \frac{J\hat{\lambda}_r}{|\hat{\lambda}_r|}\hat{v}_{sq} \quad (27)$$

$$\hat{v}_{sd} = \frac{\sigma L_s}{M|\hat{\lambda}_r|}\left[\left((L_{FD}-1)2\frac{R_r}{L_r} - \frac{M^2 R_r}{\sigma L_s L_r^2} - L_{FP}\right)|\hat{\lambda}_r|^2 - \frac{R_r}{L_r}M^2|i_s|^2\right] + \quad (28)$$

$$\frac{\sigma L_s}{M|\hat{\lambda}_r|}\left[M\left(k + (1-L_{FD})2\frac{R_r}{L_r}\right)i_s^T\hat{\lambda}_r - \frac{M\omega n_p}{\mu}\hat{T}_e + L_{FP}F_{ref}\right]$$

$$\hat{v}_{sq} = \frac{\sigma L_s}{\mu|\hat{\lambda}_r|}\left[k\hat{T}_e + \frac{dT_{ref}}{dt} + \hat{\lambda}_r^T\left(\frac{M}{\sigma L_s L_r}\hat{\lambda}_r + i_s\right)\mu n_p\omega\right] + \quad (29)$$

$$\frac{\sigma L_s}{\mu|\hat{\lambda}_r|}\left[-L_{TP}(\hat{T}_e - T_{ref}) - L_{TI}\int_0^t(\hat{T}_e - T_{ref})ds\right].$$

where $\hat{T}_e = \mu i_s^T J \hat{\lambda}_r$.

By neglecting nonlinear terms (28), (29) are simplified as follows $$\hat{v}_{sd} = -\tilde{L}_{FD}\left(-\hat{\lambda}_r^2 + M\hat{\lambda}_r^T i_s\right) - \tilde{L}_{FP}\left(\hat{\lambda}_r^2 - F_{ref}\right) \quad (30)$$

$$\hat{v}_{sq} = -\tilde{L}_{TP}(\hat{T}_e - T_{ref}) - \tilde{L}_{TI}\int_0^t(\hat{T}_e - T_{ref})ds. \quad (31)$$

where ~ is used to denote the new set of feedback gains.

From (14) follows that the expression in first brackets in (30) is the derivative of the square of the norm of the flux.

Thus the controller (30), (31) is a combination of PI controller for torque regulation and PD controller for flux regulation. By selecting of the gains in (30), (31) high enough the performance of the simplified controller (30), (31) can be made close to that of nonlinear controller (28), (29).

The direct torque and flux control method of the present invention, which includes the rotor speed observer 30 and the rotor flux observer 32, has been previously described with reference to FIG. 1. The speed observer 30 can be implemented using well known techniques; see for example, Bondarko, V., and Zaremba, A., "Speed and flux estimation for an induction motor without position sensor," in Proc. Amer. Contr. Conf., San Diego, June 1999. Likewise, the rotor flux analytical observer 32 can be implemented using any of several designs readily available from the prior literature, as is evidenced by Zaremba, A., and Semenov, S., "Speed and Rotor Resistance Estimation for Torque Control of an Induction Motor," in Proc. Amer. Contr. Conf., Chicago, June 2000. The torque and flux regulator 14 is based on equations (26)–(29), or simplified equations (30) –(31) above.

Another control scheme can be obtained using a steady-state solution of the torque-flux model (16). The steady-state based (SSB) scheme is significantly simpler than the dynamic scheme from the previous section and it has better robust properties with respect to current measurement noise.

The controller design is based on utilizing the natural dynamics of IM. For simplicity, it is assumed that the rotor speed is constant. The idea of the controller design is to calculate a steady state solution of (16) with a constant input. Since the state matrix is constant and stable the steady state point exists and can be calculated as a solution of an algebraic equation.

Denote $$v_1 = -\frac{\mu}{\sigma L_s}\lambda_r^T J v_s \quad v_2 = \frac{R_r M}{L_r}|i_s|^2 + \frac{1}{\sigma L_r}\lambda_r^T v_s. \quad (32)$$

The matrix at the state variable in the right-hand side of (16) is denoted by A.

The steady state point $Z_{st} = [T_{ref}, F_{ref}, z_3]^T$ for some value of $z_3$ is defined by the algebraic equation $$A[T_{ref}, F_{ref}, z_3]^T = -[v_1 b, 0, v_2]^T \quad (33)$$

To solve the equation (33) with respect to $v_1$ and $v_2$ the addend containing $z_3$ is moved to the right-hand side $$B[T_{ref}, F_{ref}]^T = G[v_1, v_2, z_3]^T,$$

where $$B = \begin{bmatrix} -k & -\frac{\mu M n_p \omega}{\sigma L_s L_r} \\ 0 & -\frac{2R_r}{L_r} \\ \frac{n_p\omega}{\mu} & \frac{MR_r}{\sigma L_s L_r^2} \end{bmatrix}, \quad G = \begin{bmatrix} -1 & 0 & \mu n_p\omega \\ 0 & 0 & -\frac{2R_r M}{L_r} \\ 0 & -1 & k \end{bmatrix}.$$

The inverse matrix of G always exists and is equal to $$G^{-1} = \frac{L_r}{2R_r M} \begin{bmatrix} -\frac{2R_r M}{L_r} & -\mu n_p \omega & 0 \\ 0 & -k & -\frac{2R_r M}{L_r} \\ 0 & -1 & 0 \end{bmatrix}.$$

Thus $[v_1, v_2, z_3]^T = G^{-1} B[T_{ref}, F_{ref}]^T$ and the expressions for $v_1$ and $v_2$ are as follows $$v_1 = kT_{ref} + \mu\left(\frac{M}{\sigma L_s L_r} + \frac{1}{M}\right) F_{ref} n_p \omega, \quad (34)$$

$$v_2 = -\frac{n_p \omega}{\mu} T_{ref} + \left(\frac{R_r}{M L_r} + \frac{R_s}{\sigma L_s M}\right) F_{ref}.$$

Tracking back our notations the formulae for d and q components of the stator voltage command are obtained $$v_{sd} = \frac{\sigma L_s}{|\lambda_r|}\left(v_2 - \frac{R_r M}{L_r}|i_s|^2\right), \quad v_{sq} = \frac{\sigma L_s}{\mu|\lambda_r|} v_1. \quad (35)$$

The torque and flux controller (34), (35) is of feedforward type and it does not utilize any feedback. To implement the linear feedback of the stator current the following transformation of the voltage signal is considered: $v_s = \tilde{v}_s + \alpha i_s + \beta J i_s$. After substituting this expression into (16) the system equation with the new state matrix and new input $\tilde{v}_s$ is obtained $$\frac{dZ}{dt} = \begin{bmatrix} -k + \frac{\alpha}{\sigma L_s} & -\frac{\mu M n_p \omega}{\sigma L_s L_r} & -\mu\left(n_p \omega - \frac{\beta}{\sigma L_s}\right) \\ 0 & -\frac{2R_r}{L_r} & \frac{2R_r M}{L_r} \\ \frac{1}{\mu}\left(n_p \omega - \frac{\beta}{\sigma L_s}\right) & \frac{M R_r}{\sigma L_s L_r^2} & -k + \frac{\alpha}{\sigma L_s} \end{bmatrix} Z + \quad (36)$$

$$\begin{bmatrix} -\frac{\mu}{\sigma L_s} \lambda_r^T J \tilde{v}_s \\ 0 \\ \frac{R_r M}{L_r}|i_s|^2 + \frac{1}{\sigma L_s} \lambda_r^T \tilde{v}_s \end{bmatrix},$$

where parameters $\alpha$ and $\beta$ are chosen such that the state matrix is stable. By introducing notations similar to (32)

$$\tilde{v}_1 = -\frac{\mu}{\sigma L_s} \lambda_r^T J \tilde{v}_s, \quad \tilde{v}_2 = \frac{R_r M}{L_r}|i_s|^2 + \frac{1}{\sigma L_s} \lambda_r^T \tilde{v}_s$$

from (36) the following expressions are obtained $$\tilde{v}_1 = \left(k - \frac{\alpha}{\sigma L_s}\right) T_{ref} + \mu\left(\left(\frac{M}{\sigma L_s L_r} + \frac{1}{M}\right) n_p \omega - \frac{\beta}{M \sigma L_s}\right) F_{ref} \quad (37)$$

$$\tilde{v}_2 = -\frac{1}{\mu}\left(n_p \omega - \frac{\beta}{\sigma L_s}\right) T_{ref} + \left(\frac{R_r}{M L_r} + \frac{R_s}{\sigma L_s M} - \frac{\alpha}{M \sigma L_s}\right) F_{ref}.$$

Returning back to $v_s$ we get $$v_s = \frac{\lambda_r}{|\lambda_r|} v_{sd} + \frac{J \lambda_r}{|\lambda_r|} v_{sq} + \alpha i_s + \beta J i_s, \quad (38)$$

where $$v_{sd} = \frac{\sigma L_s}{|\lambda_r|}\left(\tilde{v}_2 - \frac{R_r M}{L_r}|i_s|^2\right), \quad v_{sq} = \frac{\sigma L_s}{\mu|\lambda_r|} \tilde{v}_1. \quad (39)$$

Estimates of the rotor flux should be used instead of the hard to measure rotor flux signal. To lessen the needed information the magnitude of the rotor flux is substituted by its reference value $|\lambda_r| = \sqrt{F_{ref}}$ in (35) and (39). The values of the allowable stator current and voltage signals are limited by IM design. Thus the stator current and voltage constraints are to be taken into account for when the values of the reference torque $T_{ref}$ and reference rotor flux magnitude $F_{ref}$ are chosen. In this section this problem is analyzed for the case of constant $T_{ref}$ and $F_{ref}$. In particular the following question is answered: do the stator voltage and current satisfy the constraints for steady state operation ($|\lambda_r|^2 = F_{ref}$, $T_e = T_{ref}$)?

First consider constraints on the magnitude of the stator current. Let the constraints be set in the following way $$|i_{sd}| \leq C_{is}, |i_{sq}| \leq C_{is}, \quad (40)$$

where $i_{sd}$ and $i_{sq}$ are direct and quadrature components of $i_s$.

It follows from the definition of $T_e$ that $T_e = \mu \lambda_{rd} i_{sq}$. Thus in the steady state $|i_{sq}| = |T_{ref}|/\mu \cdot \sqrt{F_{ref}}$. To satisfy the constraint (40) $T_{ref}$ and $F_{ref}$ must be chosen according to the inequality $$|T_{ref}| \leq \mu \sqrt{F_{ref}} C_{is}. \quad (41)$$

Similar inequality is obtained from equation (14). In the steady state we have $|\lambda_r|^2 = M|\lambda_r| i_{sd}$. Thus $i_{sd} = \sqrt{F_{ref}}/M$ and the correspondent inequality is $$\sqrt{F_{ref}} \leq C_{is} M. \quad (42)$$

Unifying inequalities (41) and (42) yields the following result $$\frac{|T_{ref}|}{|\mu| C_{is}} \leq \sqrt{F_{ref}} \leq C_{is} M. \quad (43)$$

From (43) follows that $|T_{ref}|$ should be less then $$|T_{ref}| \leq \mu M C_{is}^2. \quad (44)$$

Figure 2:
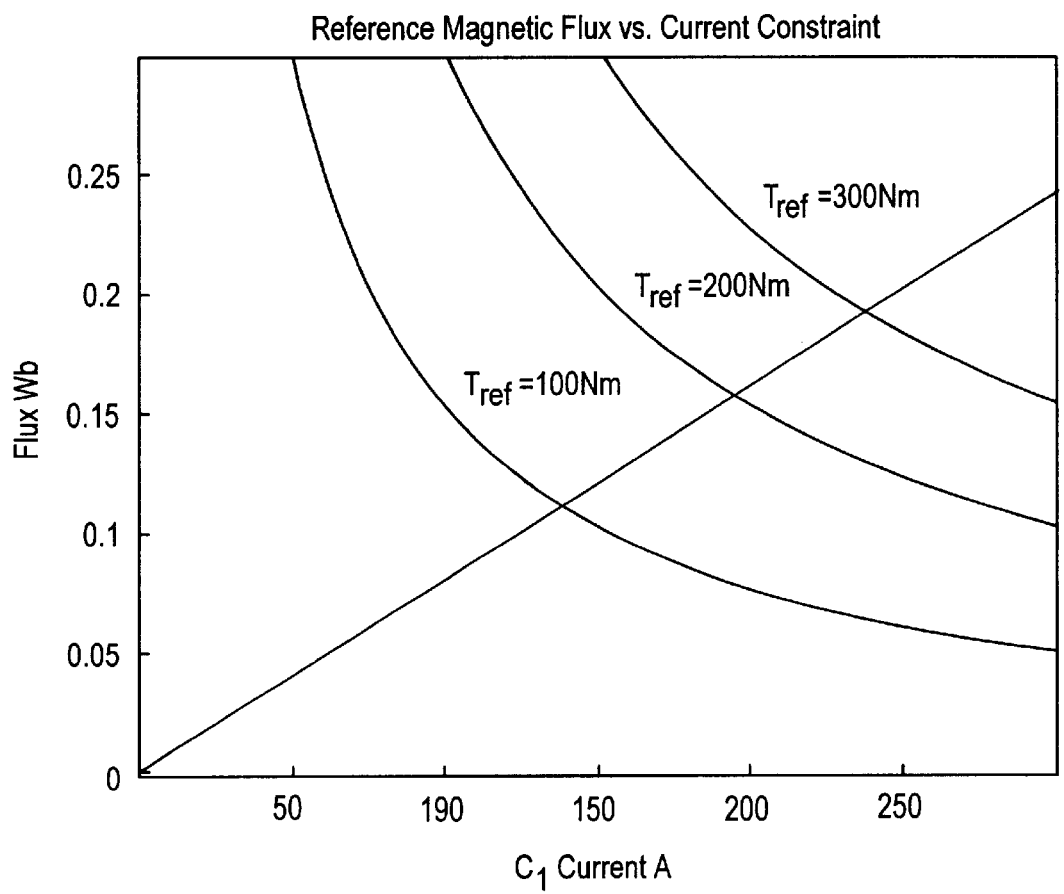
FIG. 2 is a graph showing the relationship between reference magnetic flux and current constraint, for several values of reference torque.

Inequalities (43) are illustrated by plots in FIG. 2 which define allowable values for the reference flux and minimal stator current $$C_{im} = \frac{\sqrt{T_{ref}}}{\mu M} \quad (45)$$

for different values of reference torque. The $C_{im}$ (45) is defined by intersection of the curves from left-hand-side and right-hand-side of (43). The motor parameters used for calculation in FIG. 2 are given in the table

TABLE 1

| $R_s$ | $R_r$ | M | $L_{1r}$ | $L_{1s}$ |
|---|---|---|---|---|
| 0.11 | 0.087 | 0.00081 | 0.0011 | 0.0011 |

FIG. 2 shows the flux vs current restraint for several levels of $T_{ref}$. From FIG. 2, it follows that the reference flux value satisfying the constraint exists if $C_{is}$ is greater than the minimal value (45)

$$C_{is} \geq C_{im}. \tag{46}$$

Now consider stator voltage constraints that are set in the same way $$|v_{sd}| \leq C_{vs}, |v_{sq}| \leq C_{vs}. \tag{47}$$

Values of d, q components of the stator voltage command at the steady state are given by expressions (34), (35). Utilizing the equality $|i_s^2 = i_{sd}^2 + i_{sq}^2 = F_{ref}/M^2 + T_{ref}^2/(\mu^2 F_{ref})$ the expressions for the stator voltage command magnitude are obtained $$v_{sq} = \sigma L_s \left[ \frac{k}{\mu} \frac{T_{ref}}{\sqrt{F_{ref}}} + \sqrt{F_{ref}} \left( \frac{M}{\sigma L_s L_r} + \frac{1}{M} \right) n_p \omega \right], \tag{48}$$

$$v_{sd} = \frac{\sigma L_s}{\sqrt{F_{ref}}} \left[ \frac{R_s}{\sigma L_s M} F_{ref} - \frac{R_r M}{\mu^2 L_r} \frac{T_{ref}^2}{F_{ref}} - \omega \frac{n_p}{\mu} T_{ref} \right]. \tag{49}$$

The correspondent inequalities are $$\frac{\sigma L_s}{\sqrt{F_{ref}}} \left| \frac{R_s}{\sigma L_s M} F_{ref} - \frac{R_r M}{\mu^2 L_r} \frac{T_{ref}^2}{F_{ref}} - \omega \frac{n_p}{\mu} T_{ref} \right| \leq C_{vs} \tag{50}$$

$$\sigma L_s \left| \frac{k}{\mu} \frac{T_{ref}}{\sqrt{F_{ref}}} + \sqrt{F_{ref}} \left( \frac{M}{\sigma L_s L_r} + \frac{1}{M} \right) n_p \omega \right| \leq C_{vs}. \tag{51}$$

Given the numbers $C_{vs}$ and $C_{is}$ inequalities (43), (50) and (51) define all possible combinations of $\{T_{ref}, F_{ref}, \omega\}$ such that at the steady state stator current and stator voltage command satisfy constraints (40), (47). From results above the following optimization problem arises: find the reference flux $F_{ref}(\omega, T_{ref})$ such that the triple $\{T_{ref}, F_{ref}(\omega, T_{ref}), \omega\}$ satisfy inequalities (43), (50), (51) and maximum value of the torque is achieved over given range of speed $\omega \in [(\omega_{min}, \omega_{max}]$.

The effectiveness of the control method of the present invention, described above has been verified in simulation testing. The controller corresponds to equations (26)–(29), and the motor parameters are shown in Table 1 above. The reference value for the squared rotor flux is $F_{ref}=0.012$ Wb$^2$. The simulated testing has shown unexpected positive results using sensorless control wherein the control method is insensitive to rotor resistance variations.

It is apparent that the present invention provides a novel approach to controlling torque and flux of an induction motor that is based on direct tracking of the torque and flux signals. The dynamic model is obtained using stator voltage as an input that permits separation of the torque and flux regulation. The control method provides PI regulation of the torque and PD regulation of the flux, while assuring asymptotic stability of torque and flux tracking.

Furthermore, from the foregoing, it may be appreciated that a method is also provided for torque and flux regulation that is based on steady state solution of the torque-flux dynamic model described above for slow reference signals.

From the foregoing, it is apparent that the motor control system described above not only provides for the reliable accomplishment of the objects of the invention, but does so in a particularly effective and economical manner. It is recognized, of course, that those skilled in the art may make various modifications or additions chosen to illustrate the invention without departing from the spirit and scope of the present contribution to the art. Accordingly, it is to be understood that the protection sought and to be afforded hereby should be deemed to extend to the subject matter claimed and all equivalents thereof fairly within the scope of the invention.

What is claimed is:

1. A method of controlling torque of a multi-phase induction motor based on direct tracking of the motor's torque and flux, comprising:

(a) estimating rotor speed of said motor;

(b) estimating rotor flux from said estimated rotor speed and stator current;

(c) estimating rotor torque from said estimated rotor flux; and (d) using the estimated rotor torque and estimated rotor flux to control said motor.

2. The method of claim 1, wherein step (a) includes estimating said rotor speed as a function of first and second order derivatives of a filtered stator current signal and first order derivative of a filtered stator voltage signal.

3. The method of claim 1, wherein step (b) is performed using the combination of said estimated rotor speed and the stator current.

4. The method of claim 1, wherein step (a) is performed using a position sensor.

5. The method of claim 1, wherein step (a) is performed by estimating speed as a function of filtered stator current and voltage signals.

6. The method of claim 1, wherein step (d) is performed based on a steady state solution of the following equations $$\tilde{v}_1 = \left(k - \frac{\sigma}{\sigma L_s}\right) T_{ref} + \mu \left(\left(\frac{M}{\sigma L_s L_r} + \frac{1}{M}\right) n_p \omega - \frac{\beta}{M \sigma L_s}\right) F_{ref}$$

$$\tilde{v}_2 = -\frac{1}{\mu} \left(n_p \omega - \frac{\beta}{\sigma L_s}\right) T_{ref} + \left(\frac{R_r}{M L_r} + \frac{R_s}{\sigma L_s M} - \frac{\alpha}{M \sigma L_s}\right) F_{ref}.$$

wherein:

$\tilde{v}_1, \tilde{v}_2$ are voltages k is $$k = \frac{R_r}{L_r} + \frac{1}{\sigma L_s}\left(R_s + \frac{M^2 R_r}{L_r^2}\right).$$

σ is $1 - M^2/L_s L_r$—leakage parameter $T_{ref}$ is the reference torque $\mu$ is $3n_p M/2L_r$ M is mutual inductance $L_s, L_r$ are stator and rotor inductance, respectively $n_p$ is number of pole pairs ω is angular speed of the rotor β is parameter chosen so that the state matrix is stable $F_{ref}$ is the flux reference value $R_r, R_s$ are rotor and stator resistance, respectively.

7. The method of claim 1, wherein step (d) is performed based on a steady state solution of the following equations $$v_s = \frac{\lambda_r}{|\lambda_r|} v_{sd} + \frac{J\lambda_r}{|\lambda_r|} v_{sq} + \alpha i_s + \beta J i_s,$$

-continued
$$v_{sd} = \frac{\sigma L_s}{|\lambda_r|}\left(\tilde{v}_2 - \frac{R_r M}{L_r}|i_s|^2\right), \quad v_{sq} = \frac{\sigma L_s}{\mu|\lambda_r|}\tilde{v}_1.$$

wherein:

$v_s$ is voltage $v_{sd}$ is voltage $\lambda_r$ is rotor flux

J is $$\begin{pmatrix} 0 & -1 \\ 1 & 0 \end{pmatrix}$$

$v_{sq}$ is the component of stator voltage orthogonal to the rotor flux $\alpha,\beta$ ad are parameters chosen so that the state matrix is stable $i_s$ is stator current are voltages defined by equation 37

$R_r$ is rotor resistance

M is mutual inductance, $L_r$ is rotor inductance $L_s$ is stator inductance $\mu$ is $3n_p M/2L_r$.

8. The method of claim 1, wherein step (d) is performed using a dynamic torque-flux model defined by the following equation $$\frac{dZ}{dt} = \begin{bmatrix} -k & -\frac{\mu M n_p w}{\sigma L_s L_r} & -\mu n_p w \\ 0 & -\frac{2R_r}{L_r} & \frac{2R_r M}{L_r} \\ \frac{n_p w}{\mu} & \frac{MR_r}{\sigma L_s L_r^2} & -k \end{bmatrix} Z + \begin{bmatrix} \frac{\mu}{\sigma L_s}|\lambda_r|v_{sq} \\ 0 \\ \frac{R_r M}{L_r}|i_s|^2 + \frac{1}{\sigma L_s}|\lambda_r|v_{sd} \end{bmatrix}.$$

wherein:

Z is new state vector k is $$k = \frac{R_r}{L_r} + \frac{1}{\sigma L_s}\left(R_s + \frac{M^2 R_r}{L_r^2}\right).$$

$\mu$ is $3n_p M/2L_r$

M is mutual inductance $n_p$ is number of pole pairs $\omega$ is angular speed of the rotor $\sigma$ is $1-M^2/L_s L_r$—leakage parameter $L_s, L_r$ are stator and rotor inductance, respectively $R_r$ is rotor resistance $\lambda_r$ is rotor flux $v_{sq}$ is the component of stator voltage orthogonal to the rotor flux $i_s$ is stator current $v_{sd}$ is voltage.

9. The method of claim 1, wherein step (d) is performed by commanded said motor with by a voltage given by the following equations $$\hat{v}_{sd} = -\tilde{L}_{FD}\left(-\hat{\lambda}_r^2 + M\hat{\lambda}_r^T i_s\right) - \tilde{L}_{FP}\left(\hat{\lambda}_r^2 - F_{ref}\right)$$

$$\hat{v}_{sq} = -\tilde{L}_{TP}\left(\hat{T}_e - T_{ref}\right) - \hat{L}_{TI}\int_0^t \left(\hat{T}_e T_{ref}\right) ds.$$

where $v_{sd}$ is estimated component of the stator voltage $L_{fd}$ is gain of the controller $\hat{\lambda}_r$ is estimated rotor flux M is mutual inductance $\lambda_r^T$ is estimated transposed rotor flux $i_s$ is stator current is gain of the controller $F_{ref}$ is the flux reference value $v_{sq}$ is the component of stator voltage orthogonal to the rotor flux $L_{TP}$ is the gain of the PI controller $T_e$ is estimated electromagnetic torque $T_{ref}$ is reference torque $L_{TI}$ is estimated gain of the PI controller.

10. The method of claim 1, wherein step (d) is performed by determining a steady state solution of the following equation $$\frac{dZ}{dt} = \begin{bmatrix} -k & -\frac{\mu M n_p \omega}{\sigma L_s L_r} & -\mu n_p \omega \\ 0 & -\frac{2R_r}{L_r} & \frac{2R_r M}{L_r} \\ \frac{n_p \omega}{\mu} & \frac{MR_r}{\sigma L_s L_r^2} & -k \end{bmatrix} Z + \begin{bmatrix} -\frac{\mu}{\sigma L_s}\lambda_r^T J v_s \\ 0 \\ \frac{R_r M}{L_r}|i_s|^2 + \frac{1}{\sigma L_s}\lambda_r^T v_s \end{bmatrix}.$$

wherein:

Z is new state vector k is $$k = \frac{R_r}{L_r} + \frac{1}{\sigma L_s}\left(R_s + \frac{M^2 R_r}{L_r^2}\right).$$

$\mu$ is $3n_p M/2L_r$

M is mutual inductance $n_p$ is number of pole pairs $\omega$ is angular speed of the rotor $\sigma$ is $1-M^2/L_s L_r$—leakage parameter $L_s, L_r$ are stator and rotor inductance, respectively $R_r$ is rotor resistance $\lambda_r^T$ is estimated transposed rotor flux J is $$\begin{pmatrix} 0 & -1 \\ 1 & 0 \end{pmatrix}$$

$v_s$ is voltage.

* * * * *